Patented Feb. 10, 1953

2,628,193

UNITED STATES PATENT OFFICE 2,628,193

ION-EXCHANGE RESINS

Gaetano F. D'Alelio, Pittsburgh, Pa., assignor to Koppers Company, Inc., a corporation of Delaware No Drawing. Application September 24, 1949, Serial No. 117,723

25 Claims. (Cl. 210—24)

This invention relates to new ion-exchange resins. More particularly, it relates to the preparation of ion-exchange resins from polymerizable mono-vinyl-aromatic and mono-(alpha-alkyl-vinyl)-aromatic compounds and copolymerizable alkenyl halides.

Ion-exchange resins have been found desirable for a wide variety of commercial uses. For example, such resins are being used in the purification, deionization, and softening of water, the recovery of magnesium from sea water and brine, the recovery of copper and ammonia from waste cuprammonium solutions in rayon plants, the recovery of amino acids from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

One of the best types of ion-exchange resins for many of these purposes is disclosed in applicant's U. S. Patent 2,366,007, assigned to the General Electric Company. Cation-exchange resins of this type comprise sulfonated copolymers of mono-vinyl-aromatic compounds and divinyl-aromatic compounds, such as prepared by the sulfonation of an insoluble, infusible styrene-divinyl benzene copolymer. One commercial form of this type of cation-exchange resin is known as Dowex 50.

Divinyl benzene monomer, however, is not commercially available in highly concentrated form since purification methods do not permit concentrations higher than approximately 50 percent by weight of divinyl benzene. Such divinyl benzene mixtures as are available contain ethyl styrene, diethyl benzene, the various divinyl benzene isomers, etc., in varying proportions. The same condition is also generally true of other divinyl aryl compounds since the commonly used dehydrogenation method of preparing these divinyl aryl compounds from the corresponding dialkyl aryl compounds result in complex mixtures of the divinyl aryl compounds, the starting dialkyl aryl compounds and the intermediate mono-vinyl aryl compounds, as well as isomers and by-products of the divinyl aryl compounds. In any of these complex mixtures, most of the constituents have boiling points which are within a small temperature range, and separation of the monomers by distillation requires careful fractionation. Since the unsaturated compounds, especially the divinyl aryl compounds, have a great tendency to polymerize, the mixture cannot be subjected to a careful or prolonged distillation without considerable loss of monomer through polymerization. Therefore, the use of these divinyl aryl compounds is generally limited to these mixtures having concentrations of no more than about 50 percent divinyl aryl compound.

The fact that these divinyl aryl compounds are commercially available only in such complex mixtures in which the proportions of the various components are unpredictable and difficult to control makes it difficult to control exactly the nature of the copolymers resulting from polymerization with styrene, etc. Moreover the presence of compounds such as diethyl benzene in the polymerization mixture retards the formation of high molecular weight polymers, and variations in the available amount of divinyl aryl compounds in these mixtures cause variations in the amount of cross-linking accomplished in the resulting copolymers.

Ion-exchange resins of great utility have now been found which comprise the water-insoluble, sulfonated copolymers of at least one polymerizable mono-vinyl-aromatic or mono-(alpha-alkyl-vinyl)-aromatic compound and at least one copolymerizable alkenyl halide, which copolymers have been subjected to alkylation conditions to effect cross-linking.

Copolymers suitable for the practice of this invention can be prepared by any suitable method, for example, by mass, solution, emulsion or suspension polymerization. The polymerizations can be catalyzed, advantageously at low temperatures, by Friedel-Crafts type catalysts, e. g., $AlCl_3$, $SnCl_4$, $BF_3$, etc. or acid catalysts, such as $H_2SO_4$, $H_3PO_4$, etc. The use of such catalysts simplifies the effecting of alkylation conditions since a mere increase in temperature may be the only change necessary to cause cross-linking of the copolymer by alkylation of the aromatic nuclei with the halide-substituted copolymer chain. Peroxides and other per-compounds, e. g., benzoyl, hydrogen, acetyl, acetyl-benzoyl, phthalyl, lauroyl peroxides, t-butyl hydroperoxide, ammonium persulfate, sodium persulfate, sodium perchlorate, etc. can also be used to aid the polymerization but in cases where the alkenyl halide is somewhat sluggish in copolymerizing with the alkenyl aromatic compound or acts as an inhibitor for the same, the proportion of per-compound catalyst required is generally greater than would otherwise be required. However, when the per-compound catalysts are used, or substantial cross-linking has not been effected, cross-linking may be accomplished by exposure to alkylating conditions either separately from or simultaneously with sulfonation. When desired, the cross-linking-alkylation step may actually be performed as a separate step from the sulfonation either with the same catalyst, if suitable, and more favorable temperature conditions; or the sulfonated polymer may be separated from the sulfonation reaction mixture and the alkylation carried out with fresh sulfuric acid or Friedel-Crafts catalysts, such as $AlCl_3$, $BF_3$, HF, $SnCl_4$, etc. Moreover the alkylation may be effected before the sulfonation with any of the alkylation catalysts mentioned.

Monoalkenyl aromatic compounds which can be used in the preparation of these copolymers have the formula

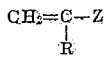

wherein R is hydrogen or an alkyl group, advantageously of less than 3 carbon atoms, and Z is an aryl group which has positions on an aromatic nucleus available for substitution. The formula includes vinyl aryl compounds, such as styrene, vinyl naphthalene, vinyl diphenyl, vinyl fluorene, etc. and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrenes, e. g., o, m and p-methyl-styrenes, dimethyl-styrenes, o, m and p-ethyl-styrenes, isopropyl-styrenes, tolyl-styrenes, benzyl-styrenes, cyclohexyl-styrenes, methoxy-styrenes, phenoxy-styrenes, o, m and p-chlorostyrenes, o, m and p-fluorostyrenes, chloromethyl-styrenes, fluoromethyl-styrenes, trifluoromethyl-styrenes, vinyl-methyl-naphthalenes, vinyl ethyl-naphthalenes, vinyl-chloro-naphthalenes, vinyl-methyl-chloro-naphthalenes, etc. Polymerizable monomers which are also included by the formula and which can be used advantageously with ionic type catalysts include aromatic compounds having a vinyl group containing an alkyl group in its alpha position, e. g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc. and may have other substituents on the aromatic nuclei as illustrated above for the vinyl aryl compounds. For ease of polymerization, the alpha-alkyl group is advantageously methyl or ethyl.

Copolymerizable alkenyl halides suitable for the purposes of this invention include methallyl chloride, allyl chloride, 2,3-dichloro-propene-1, crotyl chloride, vinyl chloride, vinylidene chloride, 1-chloro-1-fluoro-ethylene, 4-chlorobutene-1, pentenyl-chlorides, etc.

Some copolymers prepared by the copolymerization of these vinyl- and alpha-alkyl-vinyl-aromatic compounds with these alkenyl halide compounds are not new and have been disclosed previously. However, the sulfonated and cross-linked derivatives of these copolymers which are suitable for use as ion-exchange resins are new and are claimed herein.

The invention may be best described by the following examples. These examples serve to illustrate various methods of practicing the invention and are not intended as limitations to the scope of the invention. In these examples and throughout the specification "parts" and "percent" are given in parts and percent by weight.

*Example I*

A mixture of 90 parts styrene, 10 parts methallyl chloride and 300 parts of methyl chloride is cooled to a temperature between —80° C. and about —100° C. This mixture is placed in a reactor having a good stirrer and a refrigerating jacket containing ethylene or other suitable refrigerant. Polymerization is then effected by the addition thereto of approximately 10 parts of a 0.6 percent solution of aluminum chloride in methyl chloride. The polymerization is completed within a few minutes to yield a thermoplastic powder product which is separated from the reaction mixture and any retained methyl chloride is allowed to evaporate.

Fifty parts of this copolymer product is simultaneously cross-linked and sulfonated by reacting with about 200 parts of 98 percent sulfuric acid with the temperature being raised gradually from room temperature to about 100° C. The sulfonated product is removed from unreacted sulfuric acid by filtration or decantation, and the sulfonated polymer is then treated with a large volume of water to remove any residual sulfuric acid. After filtering, washing and drying, a good yield of sulfonated copolymer is obtained. From the weight of the yield as compared to the original weight of copolymer, with allowance for the loss of HCl in the alkylation step, it is possible to calculate roughly the average number of sulfonic acid groups which have been substituted onto each aryl nucleus. By the preceding technique it is generally possible to attach an average of 1.5 or more sulfuric acid groups to each aryl nucleus. For many applications as little as an average of 0.1 sulfonic group per aryl nucleus may be introduced.

In the preceding example the methallyl chloride may be replaced by allyl chloride, vinyl chloride, vinylidene chloride, etc., the cross-linking may be effected by the use of $AlCl_3$ or other Friedel-Crafts catalysts, and the sulfonation may be accomplished also by using chlorosulfonic acid, fuming sulfuric acid, sulfur trioxide alone or in the presence of liquid $SO_2$ or another nonreactive diluent, etc. The following examples illustrate how the sulfonated copolymers of this invention can be used for adsorbing cations from liquid media.

*Example II*

Ten parts of the water-insoluble sulfonated copolymer of Example I are wet with 100 parts of distilled water, and 200 parts of standardized sodium hydroxide solution are added with shaking. After standing 15 minutes, the solution is filtered and the sodium hydroxide remaining in solution is determined by titrating the filtrate with standardized hydrochloric acid. The efficiency of the resin is determined by calculating the ratio of sodium ions actually removed from the solution to the sodium ions theoretically removable. A very good ion-exchange efficiency is shown by calculations which indicate that approximately each of the calculated sulfonic acid groups in the copolymer removes a sodium ion from the solution. The sulfonated resin can also be converted to the sodium salt by treatment with a dilute or concentrated sodium chloride solution.

Example III

Ten parts of the water-insoluble sulfonated copolymer of Example I are wet with 100 parts of distilled water, and then 200 parts of a standardized calcium chloride solution are added with shaking. After standing 15 minutes, the solution is filtered and the hydrochloric acid generated by the adsorption of the calcium ions from the solution is determined by titration with standardized sodium hydroxide solution. A good ion-exchange efficiency of the resin is indicated by calculations made according to the method described in Example II.

Example IV

The exhausted resin from Example II is regenerated by treating it with approximately ⅓ N hydrochloric acid. After filtering off the acid and washing well with distilled water, the sulfonated copolymer is retested for its ability to adsorb cations according to the method described in Example II. The efficiency after regeneration approximates the original capacity of the resin.

Although the above examples show the use of copolymers made by polymerizing mixtures of 90 percent styrene and 10 percent methallyl chloride, it will be understood that other proportions of the various polymerizable mono-vinyl and mono-(alpha-alkyl-vinyl)-aromatic compounds either individually or in mixtures containing any number of such compounds, and alkenyl halide compounds, also individually or in mixtures containing any number of these alkenyl halides, can be used for preparing the water-insoluble, sulfonated copolymers. The exact amount of alkenyl halide required to give sufficient cross-linking for insolubility depends on the particular cross-linking agent used but generally the proportions of monomers are advantageously about 98–75 percent of the alkenyl aromatic compound and about 2–25 percent of the alkenyl halide. Minor portions of certain other monomers, such as isobutylene, etc., may be used with the alkenyl aromatic and alkenyl halide compounds. However, these other monomers should not have functional groups which will interfere with the sulfonation of the copolymers or ion-exchange activities of the products, or which may be ruptured to give substantial decrease in length of the polymer chains or in cross-linking.

Since the sulfonic acid groups are the active ion-removing groups in these products and since these groups can only be introduced easily into an aryl nucleus, it is advantageous that the major portion of the polymerization mixture be of polymerizable monomers containing an aryl nucleus and it is necessary that there are positions available on the aryl nucleus for the cross-linking alkyl groups and for attaching sulfonic acid groups. For these latter reasons it is advantageous that the aryl nucleus has few, if any, substituents thereon. Instead of starting with a monomer mixture of the alkenyl aromatic and the alkenyl halide compounds, it is also possible to add the alkenyl halide compounds to polymers or partial polymers of the alkenyl aromatic compounds and effect cross-linking by exposure of the resultant product to alkylation conditions.

As previously mentioned, in addition to concentrated sulfuric acid, other sulfonating agents may be used, e. g., chloro-sulfonic acid, fuming sulfuric acid, sulfur trioxide, etc. In the use of sulfonating agents such as sulfuric acid it is possible that cross-linking may be completed under the catalytic effect of the sulfuric acid through alkylation of the aromatic nuclei by the halogen or haloalkyl groups attached to the polymer chain.

Cations which may be removed from various solutions by the sulfonated, insoluble copolymers of this invention include, in addition to the cations indicated in the examples, lead ions, magnesium ions, iron ions, silver ions, etc. In fact any cations which react with the sulfonic acid groups of the resin to form salts will be effectively removed from the solution. After the sulfonated resin has adsorbed the cations, it can readily be regenerated by washing with dilute acid, preferably a mineral acid which forms soluble salts with the adsorbed cations.

An inert material such as diatomaceous earth, Alundum, coke, silica, cinders, porous glass, etc. may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

The sulfonation and alkylation reactions may be effected on various forms of the copolymers, e. g., powder, bead, pellet, coating, etc. However, since the ion-exchange utility of the product is related to effective surface, it is often advantageous to have the copolymer shaped in the particular physical form in which it will ultimately be used so that the greatest concentration of sulfonic acid groups will be on easily accessible surfaces.

While there are above disclosed but a limited number of embodiments of the invention, it is possible to produce still other embodiments without departing from the inventive concept herein disclosed; and it is, therefore, desired that only such limitations be imposed upon the appended claims as are stated therein or required by the prior art.

The invention claimed is:

1. A water-insoluble resin containing a plurality of sulfonic acid groups, said groups being attached to a cross-linked polymerizate prepared by the polymerization of a polymerizable mixture comprising (1) from about 75% to about 98% of a polymerizable aromatic compound selected from the class consisting of polymerizable mono-vinyl-aromatic and mono-(alpha-alkyl-vinyl)-aromatic hydrocarbon and nuclearly-halogen-substituted hydrocarbon compounds and (2) from about 2% to about 25% of a copolymerizable alkenyl halide, said cross-linking being effected in the presence of a strong ionic catalyst.

2. A water-insoluble resin of claim 1, in which the polymerizable aromatic compound is styrene.

3. A water-insoluble resin of claim 1, in which the polymerizable aromatic compound is alpha-methyl-styrene.

4. A water-insoluble resin of claim 1, in which the copolymerizable alkenyl halide is methallyl chloride.

5. A water-insoluble resin of claim 1, in which the copolymerizable alkenyl halide is allyl chloride.

6. A water-insoluble resin of claim 1, in which the copolymerizable alkenyl halide is vinyl chloride.

7. A water-insoluble resin of claim 1, in which the polymerizable aromatic compound is styrene and the copolymerizable alkenyl halide is methallyl chloride.

8. An inert carrier coated with a water-insoluble resin of claim 1.

9. A water-insoluble, sulfonated, cross-linked polymeric styrene, said polymeric styrene having originally contained in the polymer molecule from about 75% to about 98% styrene and from about 2% to about 25% of a copolymerizable alkenyl halide before being subjected to alkylation conditions comprising a strong ionic catalyst.

10. A water-insoluble, sulfonated, cross-linked polymeric alpha-methyl-styrene, said polymeric alpha-methyl-styrene having originally contained in the polymer molecule from about 75% to about 98% alpha-methyl-styrene and from about 2% to about 25% of a copolymerizable alkenyl halide before being subjected to alkylation conditions comprising a strong ionic catalyst.

11. A water-insoluble, sulfonated, cross-linked polymeric styrene, said polymeric styrene having originally contained in the polymer molecule from about 75% to about 98% styrene and from about 2% to about 25% methallyl chloride before being subjected to alkylation conditions comprising a strong ionic catalyst.

12. A water-insoluble, sulfonated, cross-linked polymeric styrene, said polymeric styrene having originally contained in the polymer molecule from about 75% to about 98% styrene and from about 2% to about 25% allyl chloride before being subjected to alkylation conditions comprising a strong ionic catalyst.

13. A water-insoluble, sulfonated, cross-linked polymeric styrene, said polymeric styrene having originally contained in the polymer molecule from about 75% to about 98% styrene and from about 2% to about 25% vinyl chloride before being subjected to alkylation conditions comprising a strong ionic catalyst.

14. In a process for the preparation of a water-insoluble, cross-linked, ion-exchange resin, the step of sulfonating an infusible, insoluble copolymerization product of a polymerizable mixture comprising (1) from about 75% to about 98% of a polymerizable aromatic compound selected from the class consisting of polymerizable mono-vinyl-aromatic and mono-(alpha-alkyl-vinyl)-aromatic hydrocarbon and nuclearly-halogen-substituted hydrocarbon compounds and (2) from about 2% to about 25% of a copolymerizable alkenyl halide, said copolymerization product being subjected to alkylation conditions comprising a strong ionic catalyst.

15. The process of claim 14, in which the polymerizable aromatic compound is styrene.

16. The process of claim 14, in which the copolymerizable alkenyl halide is methallyl chloride.

17. The method of treating liquid media to remove cations therefrom which comprises contacting said media with a water-insoluble, sulfonated resin and separating said resin from the liquid media, said resin originally comprising the cross-linked polymerization product of a mixture comprising (1) from about 75% to about 98% of a polymerizable aromatic compound selected from the class consisting of polymerizable mono-vinyl-aromatic and mono-(alpha-alkyl-vinyl)-aromatic hydrocarbon and nuclearly-halogen-substituted hydrocarbon compounds and (2) from about 2% to about 25% of a copolymerizable alkenyl halide, said cross-linking being effected in the presence of a strong ionic catalyst.

18. The method of claim 17, in which the polymerizable aromatic compound is styrene.

19. The method of claim 17, in which the polymerizable aromatic compound is alpha-methyl-styrene.

20. The method of claim 17, in which the copolymerizable alkenyl halide is methallyl chloride.

21. The method of claim 17, in which the copolymerizable alkenyl halide is allyl chloride.

22. The method of claim 17, in which the copolymerizable alkenyl halide is vinyl chloride.

23. The method of claim 17, in which the polymerizable aromatic compound is styrene and the copolymerizable alkenyl halide is methallyl chloride.

24. The method of claim 17, in which the polymerizable aromatic compound is styrene and the copolymerizable alkenyl halide is allyl chloride.

25. The method of claim 17, in which the polymerizable aromatic compound is styrene and the copolymerizable alkenyl halide is vinyl chloride.

GAETANO F. D'ALELIO.

REFERENCES CITED

The following references are of record in the file of this patent:

UNITED STATES PATENTS

| Number | Name | Date |
| --- | --- | --- |
| 2,012,177 | Voss | Aug. 20, 1935 |
| 2,366,007 | D'Alelio | Dec. 26, 1944 |
| 2,436,614 | Sparks | Feb. 24, 1948 |

OTHER REFERENCES

Alfrey, Jour. Amer. Chem. Soc., vol. 68, pages 299–300 (1946).